(12) United States Patent
Liu (10) Patent No.: US 9,861,127 B2
(45) Date of Patent: Jan. 9, 2018

(54) ELECTRONIC CIGARETTE AND ELECTRONIC CIGARETTE DEVICE

(75) Inventor: Qiuming Liu, Shenzhen (CN)

(73) Assignee: SHENZHEN KIMSEN TECHNOLOGY CO., LTD., Shenzhen, Guangdong Province (CN)

( * ) Notice: Subject to any disclaimer, the term of this patent is extended or adjusted under 35 U.S.C. 154(b) by 1231 days.

(21) Appl. No.: 13/882,182

(22) PCT Filed: Sep. 11, 2012

(86) PCT No.: PCT/CN2012/081233
§ 371 (c)(1),
(2), (4) Date: Apr. 27, 2014

(87) PCT Pub. No.: WO2014/040217
PCT Pub. Date: Mar. 20, 2014

(65) Prior Publication Data
US 2014/0311503 A1    Oct. 23, 2014

(51) Int. Cl.
*A24F 13/00* (2006.01)
*A24F 47/00* (2006.01)
*G02B 27/18* (2006.01)

(52) U.S. Cl.
CPC ............ *A24F 47/008* (2013.01); *G02B 27/18* (2013.01)

(58) Field of Classification Search
None
See application file for complete search history.

(56) References Cited

U.S. PATENT DOCUMENTS

2008/0257367 A1* 10/2008 Paterno ................. A24F 47/008
131/328

* cited by examiner

*Primary Examiner* — Michael H Wilson
*Assistant Examiner* — Phu Nguyen
(74) *Attorney, Agent, or Firm* — Cheng-Ju Chiang (57) ABSTRACT

The present invention relates to an electronic cigarette and an electronic cigarette device, the electronic cigarette includes: a main rod with a nozzle configured at its one end, wherein, the main rod is further configured with a projection assembly at its another end away from the nozzle, the projection assembly includes a projection light source, a slide unit configured in front of the projection light source and a light source control unit connected with the projection light source to control operation of the projection light source; the slide unit includes a slide and a locking groove for insertion of the slide, and the locking groove is defined by two parallel and spaced glasses; the light source control unit includes a light source control circuit and a light source control switch connected with the light source control circuit. The electronic cigarette has a function of projecting various image light-shadows.

14 Claims, 7 Drawing Sheets

FIG. 7

ELECTRONIC CIGARETTE AND ELECTRONIC CIGARETTE DEVICE

CROSS REFERENCE TO RELATED APPLICATIONS

The present application is a 35 U.S.C. §371 National Phase conversion of International (PCT) Patent Application No. PCT/CN2012/081233, filed on Sep. 11, 2012, the disclosure of which is incorporated by reference herein. The PCT International Patent Application was filed in Chinese.

TECHNICAL FIELD

This invention relates to a field of electronic cigarette and electronic cigarette casing, and particularly to an electronic cigarette device having projection function.

DESCRIPTION OF BACKGROUND

With the deep awareness of the dangers of smoking, smoking cessation has become the common goal of most smokers, followed by this, electronic cigarettes alternatives to cigarettes, are gradually welcomed by the people.

Current electronic cigarettes each comprise a sucking rod and a power rod, the sucking rod generally comprises a sucking cylinder, a nozzle, a liquid smoke cup for accommodating liquid smoke and an atomizing device fixed within the sucking cylinder, the power rod is configured with a battery and a key switch therein for providing power. Current electronic cigarettes have same appearance and similar taste as the cigarettes, can refresh smokers and meet their smoking habit developed for many years. But current electronic cigarettes still have some defect in vision, and their traditional single key switch appears to be too rigid.

SUMMARY

An object of the present invention is: to provide an electronic cigarette, having projection function to project various image light-shadows.

Another object of the present invention is to provide an electronic cigarette, in which the atomizing control switch is set to be a sensing switch, to be connected to the power supply directly through a sucking operation.

To achieve the above objects, the present invention discloses an electronic cigarette, comprising a main rod with a nozzle configured at its one end, wherein, the main rod is further configured with a projection assembly at its another end away from the nozzle, the projection assembly includes a projection light source, a slide unit configured in front of the projection light source and a light source control unit connected with the projection light source to control operation of the projection light source.

Furthermore, wherein, the projection light source is a laser emitter, and a convex lens is coaxially configured between the laser emitter and the slide unit.

Furthermore, wherein, the projection light source is a spotlight having a reflecting shade.

Furthermore, wherein, the slide unit comprises a slide and a locking groove for insertion of the slide, and the locking groove is defined by two parallel and spaced glasses.

Furthermore, wherein, the projection assembly further comprises an independent circuit board for controlling the light source, and the light source control unit comprises a light source control circuit which is integrated on the circuit board and a light source control switch which is connected with the light source control circuit.

Furthermore, wherein, the projection assembly further comprises a lamp sleeve for positioning the projection assembly to the main rod, and the lamp sleeve is cylindrical, and has its one end threadedly connected with the main rod, and its another end configured with a flange radially inwardly extended to abut against the slide unit and formed with a projection window for images of the slide unit to be projected out.

Furthermore, wherein, the main rod comprises a power rod and a sucking rod mutually connected with the power rod; the power rod is configured with a battery therein, and the sucking rod is configured with an atomizing device therein electrically connected with the battery.

Furthermore, wherein, the nozzle is configured at an end of the sucking rod away from the power rod, the projection assembly is configured at an end of the power rod away from the sucking rod.

Furthermore, wherein, the electronic cigarette further comprises an atomizing control unit which is electrically connected with the battery for controlling the turn-on or turn-off of the atomizing device, and the atomizing control unit comprises an atomizing control circuit and an atomizing control switch connected with the atomizing control circuit.

Furthermore, wherein, the atomizing control switch is a sensing switch.

Furthermore, wherein, the sensing switch is a capacitance-type sensing switch or an airflow sensing switch.

Furthermore, wherein, the atomizing control circuit is integrated within the sensing switch.

Furthermore, wherein, the atomizing control unit further comprises an atomizing control circuit board connected with the battery and the sensing switch respectively, and the atomizing control circuit is integrated on the atomizing control circuit board.

Furthermore, wherein, the atomizing control switch is a key switch, and the atomizing control unit further comprises an atomizing control circuit board connected with the battery and the key switch respectively, and the atomizing control circuit is integrated on the atomizing control circuit board.

A further object of the present invention is: to provide an electronic cigarette device, configured with an electronic cigarette therein having projection function.

To achieve the above object, the present invention further discloses an electronic cigarette device, comprising the above described electronic cigarette, and further comprising an electronic cigarette casing, for accommodating the electronic cigarette.

The embodiments of the present invention have the technical advantages: since the electronic cigarette is configured with a projection assembly at its end away from the nozzle, the electronic cigarette therefore has the function of projecting various image light-shadows;

Secondly, since the atomizing control switch is a sensing switch, the electronic cigarette can have a beautiful and unified shape, and is more convenient and smart to use;

Finally, since the atomizing control switch can also be a key switch, to satisfy the users' using habits.

The embodiments of the present invention are further described in detail as follows in conjunction with the accompanying drawings.

DETAILED DESCRIPTION OF THE EMBODIMENTS

As shown from FIG. 1 to FIG. 7, an embodiment of the present invention provides an electronic cigarette device, which comprises an electronic cigarette 100 having projection function and an electronic cigarette casing for accommodating the electronic cigarette 100.

As shown from FIG. 1 to FIG. 6, in this embodiment, the electronic cigarette 100 comprises a sucking rod 90 and a power rod 91 mutually connected with the sucking rod, the sucking rod 90 and the power rod 91 commonly constitute a main rod, the sucking rod 90 and the power rod 91 can be detachably connected, for example: they are connected by clamp, insertion or screw threads, in this embodiment, the sucking rod 90 and the power rod 91 are preferably connected by screw threads; in addition, the sucking rod 90 and the power rod 90 can also be designed to have a undetachable integral structure.

The power rod 91 comprises a sheath 910, a battery 911, a second electrode 912, a second insulating ring 913 and a connecting sleeve 914. The battery 911 is configured within the sheath 910, for providing electrical power for the function units of the electronic cigarette 100. The second electrode 912 serves as the positive electrode of the electronic cigarette 100 and is fixed to the connecting sleeve 914 through the second insulating ring 913, the second electrode 912 is used to abut against a first electrode 11 correspondingly configured within the sucking rod 90 for conduction of circuit. The connecting sleeve 914 is used to fixedly connect the power rod 91 and the sucking rod 90.

The power rod 91 has its end far away from the sucking rod 90 to be configured with a projection assembly 80, the projection assembly 80 comprises a projection light source 81, a slide unit 82 configured in front of the projection light source 81 and a light source control unit 83 connected with the projection light source 81 to control operation of the projection light source 81.

In this embodiment, the projection assembly 80 is fixed to the power rod 91 through a lamp sleeve 84. The lamp sleeve 84 is cylindrical, and has its one end threadedly connected with the power rod 91, and its another end configured with a flange 841 radially inwardly extended to abut against the slide unit 82 and formed with a projection window 842 for images of the slide unit 82 to be projected out. In another embodiment, the lamp sleeve 84 is undetachably formed together with the power rod 91, but for convenient replacement of the slide and maintenance of the projection light source 81, the lamp sleeve 84 is thus preferably detachable from the power rod 91.

The projection light source 81 is fixed to the end port of the power rod 91 through a light source holder 811, and in this embodiment, the projection light source 81 is for example a laser emitter 812, or a spotlight 813.

Figure 1:
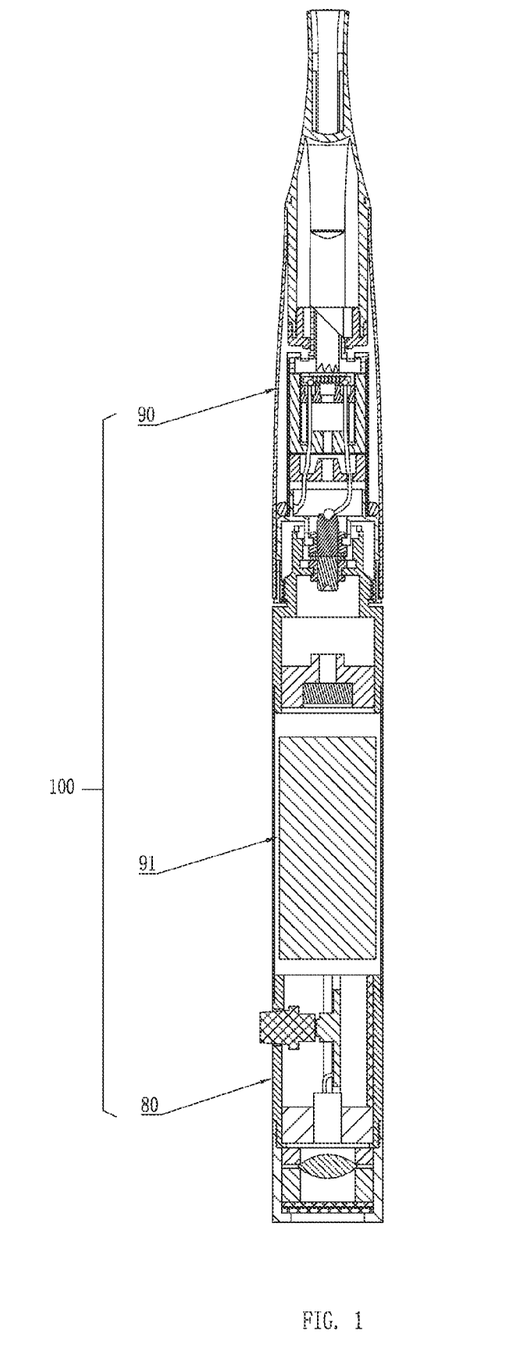
FIG. 1 is a cross-sectional view of an electronic cigarette in accordance with an embodiment of the present invention.
Figure 2:
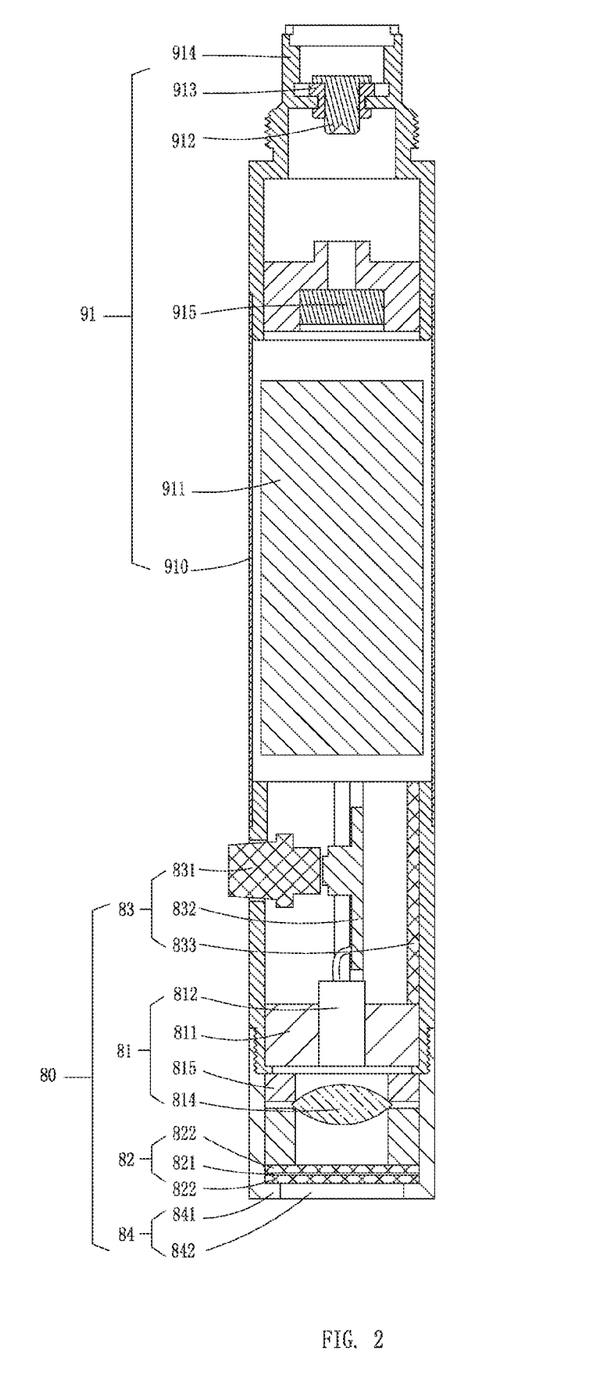
FIG. 2 is a cross-sectional view of a power rod of an electronic cigarette in accordance with a first embodiment of the present invention.
Figure 4:
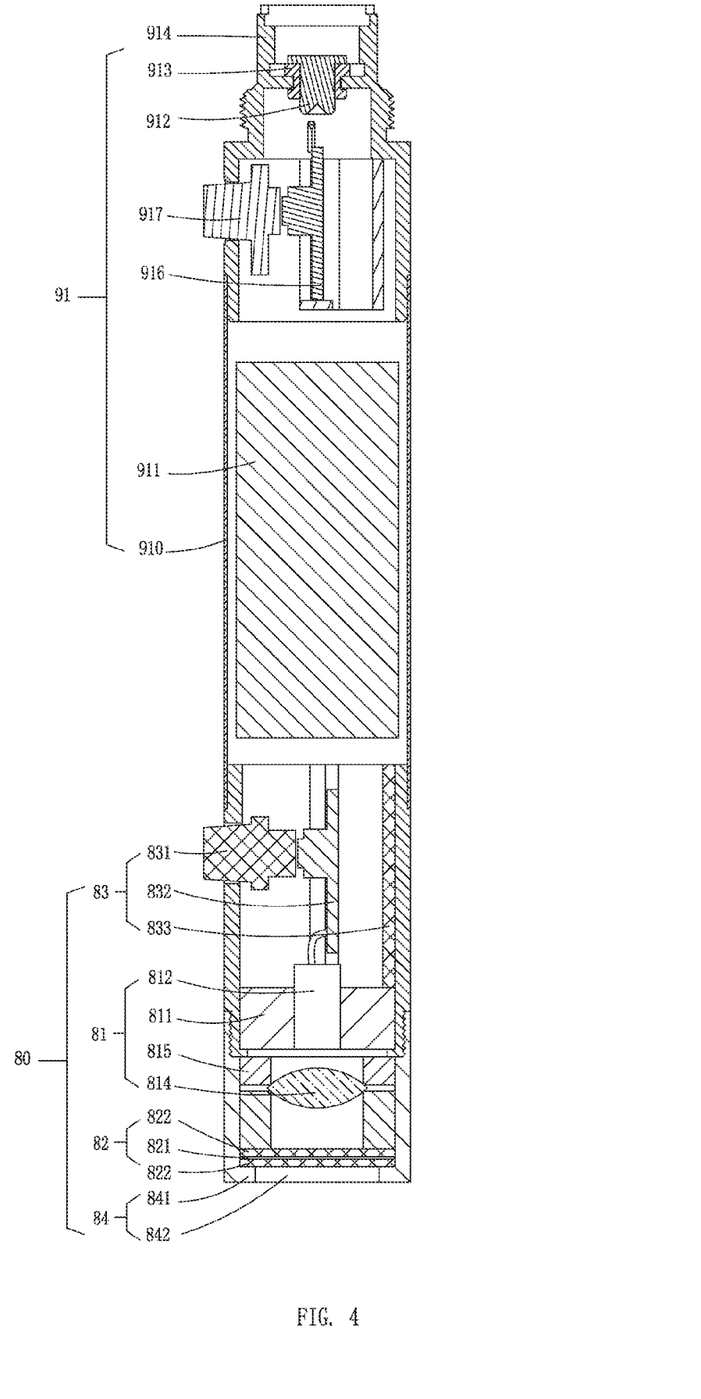
FIG. 4 is a cross-sectional view of a power rod of an electronic cigarette in accordance with a third embodiment of the present invention.

Please refer to FIG. 2 and FIG. 4, when the projection light source 81 is set to be a laser emitter 812, a convex lens 814 is coaxially configured between the laser emitter 812 and the slide unit 82. The convex lens 814 is fixed in the lamp sleeve 84 through a convex-lens holder 815 by expansion, the convex-lens holder 815 is an integrated holder defining locking slots therein to clamp the convex lens 814, or comprises two fixing rings respectively configured at opposite sides of the convex lens 814 to clamp the convex lens 814 to a position between the slide unit 82 and the laser emitter 812.

Figure 3:
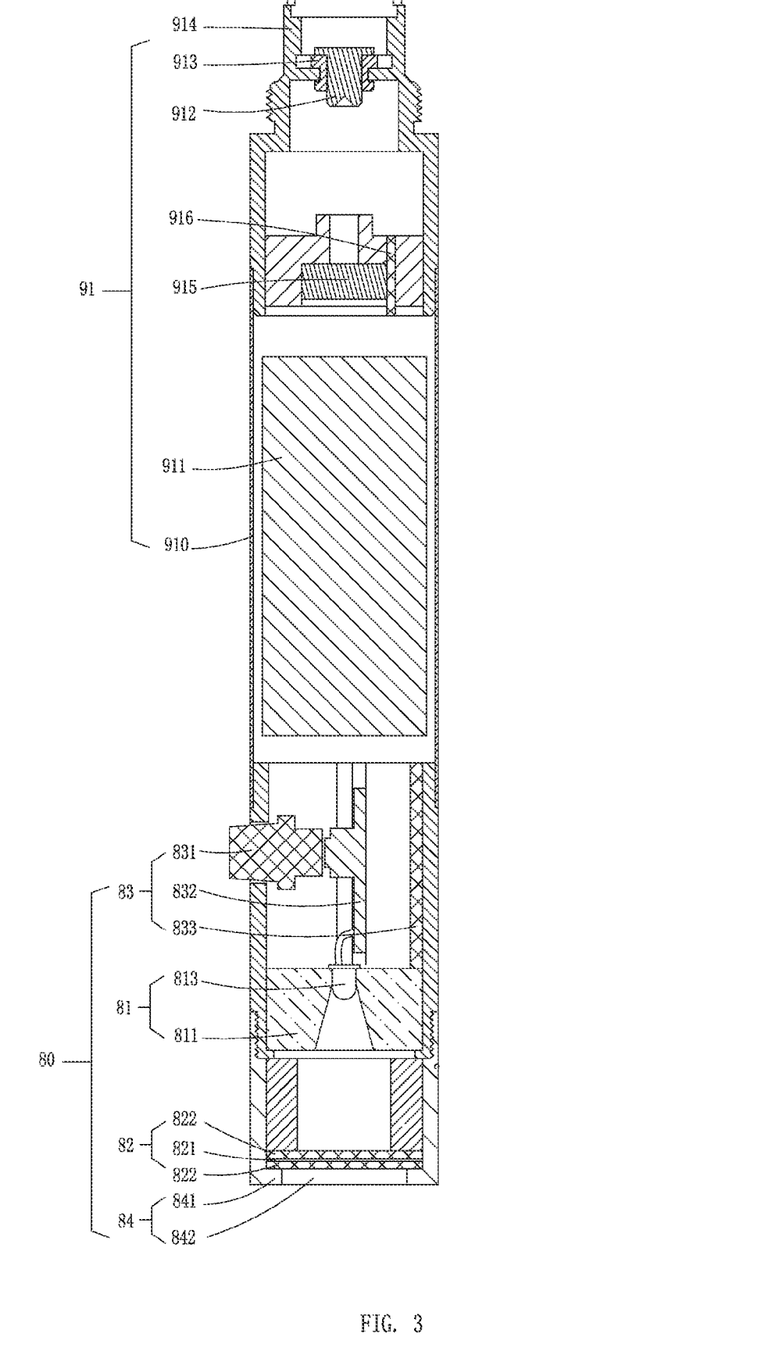
FIG. 3 is a cross-sectional view of a power rod of an electronic cigarette in accordance with a second embodiment of the present invention.
Figure 5:
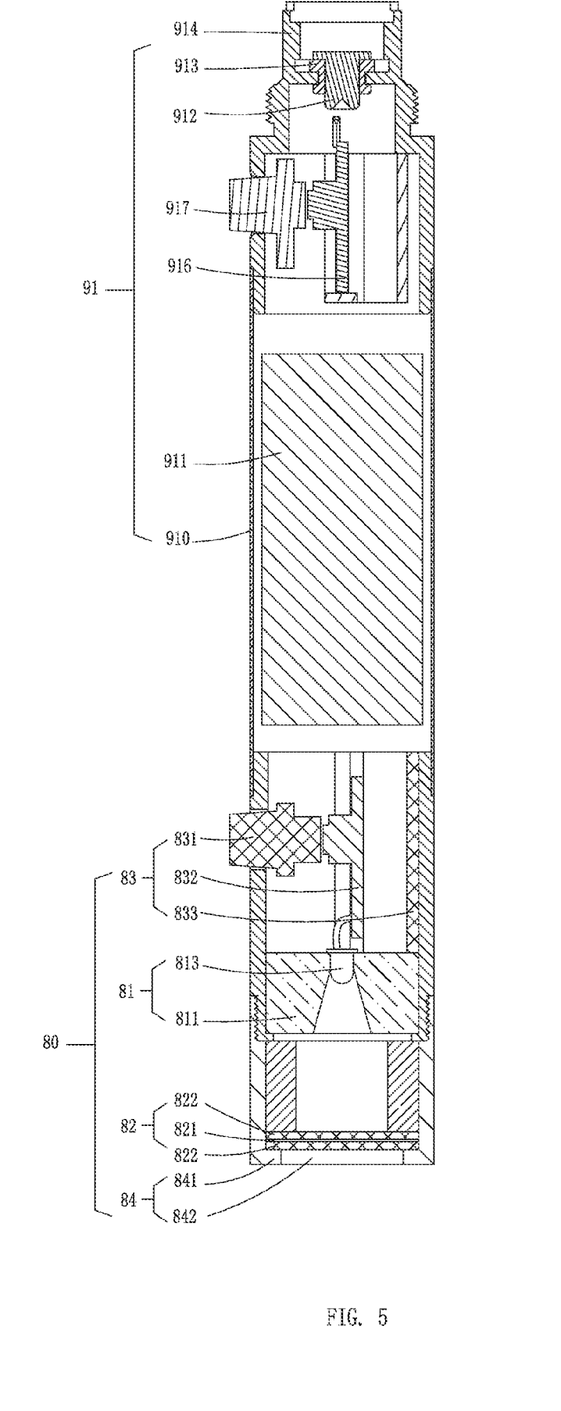
FIG. 5 is a cross-sectional view of a power rod of an electronic cigarette in accordance with a fourth embodiment of the present invention.

Please refer to FIG. 3 and FIG. 5, when the projection light source 81 is a spotlight 813, the light source holder 811 for fixing the spotlight 813 is a reflecting shade coaxially configured with the spotlight 813. The reflecting shade can have any conventional structure, for example the common structures with a bowl-shaped trapezoidal or parabolic axial profile and with its reflective surface toward the spotlight 813.

The slide unit 82 comprises a slide 821 and a locking groove for insertion of the slide 821, the locking groove is defined by two parallel and spaced glasses 822. Turning off the lamp sleeve 84, the slide 821 can be replaced according to projection needs, to meet the users' visual sense needs.

The light source control unit 83 comprises a light source control circuit respectively connected with the battery 911 and the projection light source 81 and a light source control switch 831 connected with the light source control circuit to control the turn-on or turn-off of the projection light source 81. In this embodiment, the light source control switch 831 is a key switch. Of course, the light source control switch 831 can also be a knob switch or a slide switch, or any other control switches capable of controlling the light source.

In this embodiment, the projection assembly 80 is configured with an independent circuit board 832 for controlling the light source, and the light source control circuit is integrated on the circuit board 832, and the circuit board 832 is fixed within the power rod 91 through a circuit board holder 833. In another embodiment, the circuit board 832 can also be a main circuit board for controlling the overall operation of the electronic cigarette 100, i.e., the light source control circuit can also be integrated on the main circuit board without setting an independent circuit board.

Figure 6:
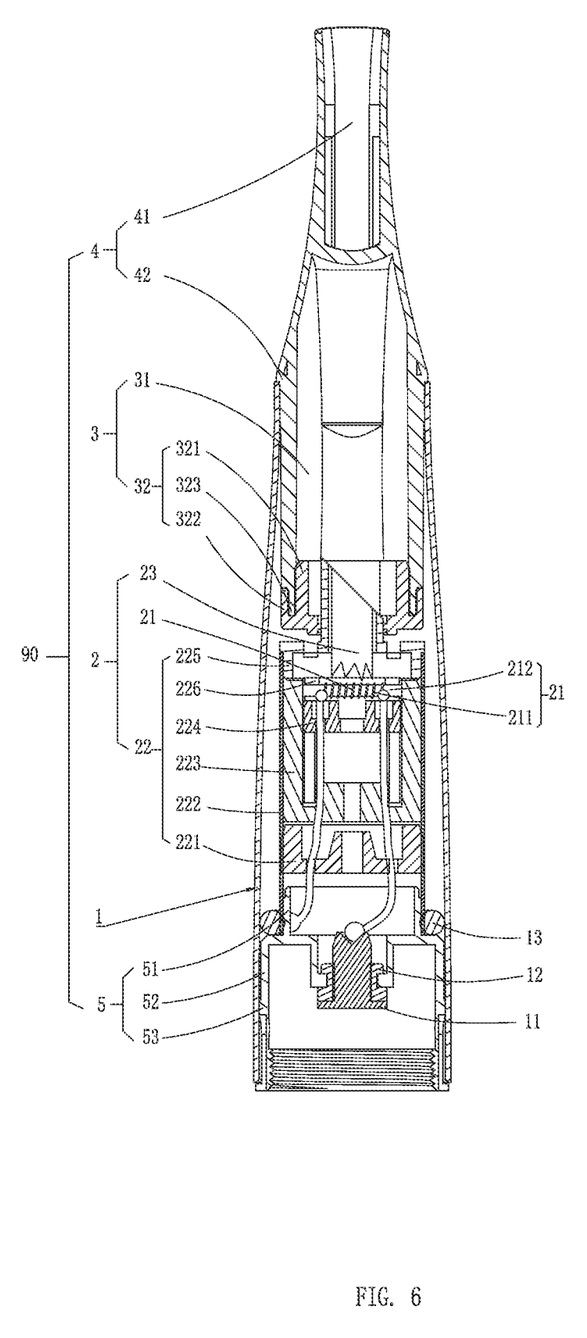
FIG. 6 is a cross-sectional view of a sucking rod of an electronic cigarette in accordance with the embodiment of the present invention.

Please refer to FIG. 6, the sucking rod 90 comprises a sucking cylinder 1, and the sucking cylinder 1 is configured with an atomizing device 2 therein for transforming the liquid smoke into smog.

The power rod 91 has its end which is connected with the sucking rod 90 to be configured with an atomizing control unit which is electrically connected with the battery 911 for controlling the turn-on or turn-off of the atomizing device 2, and the atomizing control unit comprises an atomizing control circuit and an atomizing control switch connected with the atomizing control circuit.

As shown in FIG. 2 and FIG. 3, in this embodiment, the atomizing control switch exemplarily is a sensing switch 915; specifically, the sensing switch 915 is a capacitance-type sensing switch. When the user uses the electronic cigarette 100 to inhale, the capacitance-type sensing switch changes its capacitance value after sensing the sucking airflow to connect the atomizing control circuit to the power supply, so that the electronic cigarette 100 starts to work. In another embodiment, instead the sensing switch 915 is an airflow sensing switch. When the user inhales through the sucking rod 90, a subatmospheric pressure is generated inside the electronic cigarette 100 and thus the airflow sensing switch generates a pulse signal to control the atomizing control circuit to be connected to the power supply.

Since the sensing switch 915 by itself is fabricated considerably precisely, and generally has a special controller built therein, thus the atomizing control circuit in the embodiment can be directly integrated on a controller within the sensing switch 915. In another embodiment, the atomizing control circuit is integrated on an atomizing control circuit board 916 which is independently configured outside the sensing switch 915 and connected with the sensing switch 915 and the battery 911 respectively. Of course, the atomizing control circuit board 916 can also be the above-mentioned main circuit board, that is, same to the light source control circuit, the atomizing control circuit can also be directly integrated on the main circuit board without setting an independent circuit board.

At the same time, as shown in FIG. 4 and FIG. 5, the atomizing control switch can also be a traditional key switch 917, and the key switch 917 is connected with the battery 911 through the atomizing control circuit board 916 to turn on or turn off the circuit of the atomizing device 2 of the electronic cigarette 100 by controlling the atomizing control circuit.

As shown in FIG. 6, the sucking rod 90 further comprises a liquid smoke cup 3 for accommodating the liquid smoke, a nozzle 4 and a connecting member 5 for being connected with the power rod 91. The nozzle 4 and the connecting member 5 are respectively configured at opposite ends of the sucking cylinder 1, and the atomizing device 2 is fixed in the sucking cylinder 1 through the connecting member 5, and the liquid smoke cup 3 is located in the nozzle 4.

The sucking cylinder 1 has a hollow elongated tubular shape, in this embodiment, it is cylindrical, and its diameter is gradually decrease in a direction toward the nozzle 4, i.e., the sucking cylinder 1 is sleeve with a pre-determined taper. Of course, it can also have other suitable shapes. The sucking cylinder 1 is capable of being made of stainless steel, or plastic or other suitable materials, and it can be entirely transparent or at least partially transparent, i.e., the portion where the liquid smoke cup 3 is installed is transparent to facilitate to observe the liquid smoke volume in the liquid smoke cup 3. The sucking cylinder 1 is further configured at its bottom portion with a first electrode 11 serving as a positive electrode of the atomizing device 2, a first insulating ring 12 and a hermetic ring 13 for sealing the sucking cylinder 1, and the first electrode 11 is fixed into the connecting member 5 through the first insulating ring 12 and is insulated from the connecting member 5.

The atomizing device 2 comprises an atomizer 21, an atomizing cup 22 and an oil guiding component 23.

The atomizer 21 is for transforming the liquid smoke into smog, and comprises a heating wire 211 and a fiber member 212, and the heating wire 211 is wound around the fiber member 212, and fixed into the atomizing cup 22 through the fiber member 212. In this embodiment, the fiber member 212 is capable of being made of fiberglass or other heat-resistant fiber materials.

The atomizing cup 22 comprises a cup holder 221, a cup cylinder 222, a liquid storage component 223, an atomizing seat 224, a cup cover 225 and an atomizing chamber 226.

The cup holder 211 is capable of being made of plastic material, and is matched with the cup cylinder 222 in shape and size, and is fixed to a location of the cup cylinder 222 having a suitable distance from the bottom of the cup cylinder by expanding its outer wall. In this embodiment, the cup holder 221 is a cylindrical column, and defines a vent and a plurality of perforations axially extended therethrough, the perforations are configured for the heating wire 211 to pass through.

The cup cylinder 222 is a hollow cylindrical structure, and can also be made of plastic material, and the cup cylinder 222 radially defines vents at its central portion for circulation of airflow.

The liquid storage component 223 is capable of absorbing liquid and reserving liquid like a sponge, and used for absorbing and storing the liquid smoke entering the atomizing cup 22 from the oil guiding component in order to be subsequently atomized by the atomizer 21. In this embodiment, the liquid storage component 223 is capable of being made of materials such as fiberglass, liquid absorbing cotton which can absorb liquid and reserve liquid. The liquid storage component 223 is sleeved within the cup cylinder 222 and engaged with the inner wall of the cup cylinder 222 by expansion. The liquid storage component 223 also has a hollow cylindrical structure, and is configured therein with a receiving chamber for accommodating the atomizing seat 224, a positioning post axially extended with a pre-determined height from a bottom to a top of the liquid storage component 223, a plurality of vents axially extended through the liquid storage component 223 and a plurality of perforations for the heating wire 211 to pass through.

The atomizing seat 224 is accommodated in the receiving chamber of the liquid storage component 223, and also has a hollow cylindrical structure, and generally is made of ceramic materials. The atomizing seat 224 is sleeved around the positioning post of the liquid storage component 223 by means of its inner wall, and simultaneously engaged with the inner wall of the liquid storage component 223 by expanding its outer wall, for being a support frame to support the liquid storage component 223. The atomizing seat 224 defines a locking slot radially extended through a side wall of a top portion thereof, for positioning the fiber member 212 of the atomizer 21, so as to ensure the opposite ends of the fiber member 212 to sufficiently contact with the inner wall of the liquid storage component 223 and absorb the liquid smoke therefrom for atomization, and also defines vents and a plurality of perforations for the heating wire 211 to pass through.

The cup cover 225 is used for positioning the oil guiding component 23, and is a crown-shaped cap having a peak, and covers one end of the cup cylinder 222 opposing the cup holder 221. Preferably, the cup cover 225 is a metal member.

In this embodiment, the atomizing chamber 226 is a hollow chamber constituted by the cup holder 221, the cup cylinder 222 and the cup cover 225 together, while the fiber member 212 of the atomizer 21 is axially positioned by means of the liquid storage component 223, and simultaneously is radially positioned by means of the locking slot of the atomizing seat 224 to thereby be positioned in the atomizing chamber 226. The liquid storage component 223 and the atomizing seat 224 are positioned in the atomizing chamber 226.

The oil guiding component 23 is passed through and positioned in a tube of the cup cover 225, and its opposite ends, i.e., an absorbing end and a seeping end are respectively extended into the liquid smoke cup 3 and the atomizing cup 22, for guiding the liquid smoke from the liquid smoke cup 3 into the atomizing cup 22. In this embodiment, the oil guiding component 23 is made of cotton material or fiber material. In work, the absorbing end of the oil guiding component 23 absorbs the liquid smoke from the liquid smoke cup 3, and the seeping end of the oil guiding component is extended into the atomizing chamber 226 and has its lower end surface to abut against an upper end surface of the liquid storage component 223, so that the liquid smoke is infiltrated into the liquid storage component 223 and absorbed by the fiber member 212. The oil guiding component 23 used in this embodiment makes the assembly of the sucking rod 90 more convenient and efficient, and has good liquid smoke guiding effect.

In installation of the atomizing device 2, the fiber member 212 is fixed in the atomizing chamber 226 by means of the locking slot of the atomizing seat 224, for convenient installation; the heating wire 211 is wound around the fiber member 212, and has its one end passed through the corresponding perforations in the atomizing seat 224, the liquid storage component 223 and the cup holder 221 and welded to the inner wall of an upper portion of the connecting member 5 in order to be electrically connected with the negative electrode of the power rod 91, and has its another end passed through the corresponding perforations in the atomizing seat 224, the liquid storage component 223 and welded to the first electrode 11 which is fixed into the connecting member 5 in order to be electrically connected with the positive electrode of the power rod 91.

The liquid smoke cup 3 is used for reserving the liquid smoke, and comprises a cup body 31 and a cup holder 32 hermetically connected with the cup body 31. The cup body is a hollow cylinder, and has a sealed top end, and an open bottom end for injecting the liquid smoke. For convenient observation of the volume of the liquid smoke, the cup body 31 is capable of being made of transparent or semitransparent plastic material. The cup holder 32 is used to cover the open bottom end of the cup body 31, and comprises a cylindrical base body 321, a positioning step 322 radially outwardly extended from a bottom of the base body 321 for abutting against the cup body 31, and a locking slot 323 defined between the positioning step 322 and the base body 321 for receiving the bottom of the cup body 31, and the cup holder 32 is tightly engaged with the bottom of the cup body 31 by expansion to seal the cup body 31. The cup holder is further configured with an injection hole axially extended therethrough for injecting the liquid smoke, and the injection hole is matched with the tube of the cup cover 225 in size and shape.

The nozzle 4 comprises a suction end 41 and an insertion end 42 matched with the top portion of the sucking cylinder 1. In this embodiment, the nozzle 4 is integrally formed together with the cup body 31 of the liquid smoke cup 3, and in another embodiment, the nozzle 4 is capable of being detachably engaged with the cup body 31 of the liquid smoke cup 3.

The connecting member 5 is located at a bottom of the sucking cylinder 1, and is used for fixing the atomizing device 2 into the sucking cylinder 1. In this embodiment, the connecting member 5 is made of metal conductive material, such as copper etc., and by itself serves as the second electrode (for example negative electrode) of the atomizing device 2. In this embodiment, the connecting member 5 is matched with the sucking cylinder 1 in shape, and is a hollow cylinder with opened opposite ends, and specifically comprises an upper portion 51, a central portion 52 and a lower portion 53 which have gradually increased diameters. The upper portion 51 is used for connecting with the atomizing device 2, the central portion 52 is used for mounting the first electrode 11 and the first insulating ring 12; the lower portion 53 is configured with a flange radially outwardly extended from a side wall of its bottom portion for abutting against the sucking cylinder 1 to position it. The lower portion 53 is further defined an intake slot inwardly recessed along an axial direction from the bottom extremity of its side wall, and an intake hole intercrossed with the intake slot and radially extended through the side wall, for external air to enter the connecting member 5 and then the sucking cylinder 1. The lower portion 53 is configured with inner threads at an inner wall of its bottom portion for threadedly engaging with the power rod 91. The connecting member 5 is tightly engaged with the inner wall of the sucking cylinder 1 by expanding an outer wall of the lower portion 53, and simultaneously fixes the atomizing device 2 into the sucking cylinder 1.

The hermetical ring 13 is configured between the outer wall of the atomizing device 2 and the inner wall of the sucking cylinder 1, for preventing the liquid smoke from leaking out of the sucking cylinder 1. The sucking rod 90 is electrically connected with the second electrode inside the power rod 91 by means of the connecting member 5, and electrically connected with the first electrode inside the power rod 91 by means of the first electrode 11 fixedly configured within the connecting member 5.

When a user inhales the electronic cigarette 100, the sensing switch of the atomizer is turned on and connects the circuit of the atomizing device 2, the specific current direction is: flowing from the positive electrode of the battery 911 to the second electrode 912, and passing by the first electrode 11 inside the connecting member 5 to the positive electrode of the heating wire 211, and then passing by the negative electrode of the heating wire 211 to the connecting member 5, finally returning to the negative electrode of the battery in the power rod 91 through the connecting sleeve 914 from the outer wall of the connecting member 5. Simultaneously, the light source control switch 831 is pressed, the projection light source 81 works and projects the images of the slide unit 82 to a front of the electronic cigarette 100, thus the user can have visual enjoyment while smoking.

Figure 7:
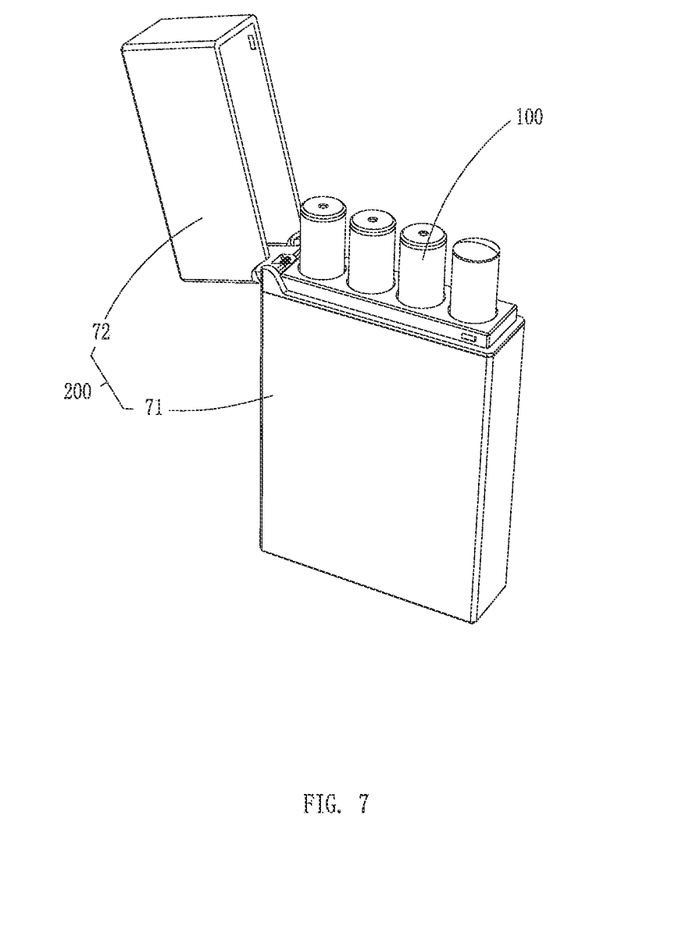
FIG. 7 is an isometric view of an electronic cigarette device in accordance with the embodiment of the present invention.

As shown in FIG. 7, the electronic cigarette are usually placed into an electronic cigarette casing 200, the electronic cigarette casing 200 comprises a casing body 71 for accommodating the electronic cigarettes 100 and a casing cap 72 covering the casing body 71. The casing body 71 is a rectangular box, certainly, its shape is not limited to be rectangular, it can also be round, oval, or polygonal, etc., so long as the casing cap 72 can be matched with the casing body 71.

The above-described is embodiments of the present invention, it should be noted that, for the persons of ordinary skill in this field, various changes and improvements within the principle and spirit of the present invention can be made, and the changed and improved solutions also fall into the protecting scope of the present invention.

What is claimed is:

1. An electronic cigarette comprising a main rod with a nozzle configured at its one end, wherein, the main rod is further configured with a projection assembly at its another end away from the nozzle, the projection assembly comprises a projection light source, a slide unit configured in front of the projection light source and a light source control unit connected with the projection light source to control operation of the projection light source, wherein a convex lens is coaxially configured between the projection light source and the slide unit; and the slide unit comprises a slide and a locking groove for insertion of the slide, and the locking groove is defined by two parallel and spaced glasses.

2. The electronic cigarette as described in claim 1, wherein, the projection light source is a laser emitter.

3. The electronic cigarette as described in claim 1, wherein, the projection light source is a spotlight having a reflecting shade.

4. The electronic cigarette as described in claim 1, wherein, the projection assembly further comprises an independent circuit board for controlling the light source, and the light source control unit comprises a light source control circuit which is integrated on the circuit board and a light source control switch which is connected with the light source control circuit.

5. The electronic cigarette as described in claim 1, wherein, the projection assembly further comprises a lamp sleeve for positioning the projection assembly to the main rod, and the lamp sleeve is cylindrical, and has its one end threadedly connected with the main rod, and its another end configured with a flange radially inwardly extended to abut against the slide unit and formed with a projection window for images of the slide unit to be projected out.

6. The electronic cigarette as described in claim 1, wherein, the main rod comprises a power rod and a sucking rod mutually connected with the power rod; the power rod is configured with a battery therein, and the sucking rod is configured with an atomizing device therein electrically connected with the battery.

7. The electronic cigarette as described in claim 6, wherein, the nozzle is configured at an end of the sucking rod away from the power rod, the projection assembly is configured at an end of the power rod away from the sucking rod.

8. The electronic cigarette as described in claim 6, wherein, the electronic cigarette further comprises an atomizing control unit which is electrically connected with the battery for controlling the turn-on or turn-off of the atomizing device, and the atomizing control unit comprises an atomizing control circuit and an atomizing control switch connected with the atomizing control circuit.

9. The electronic cigarette as described in claim 8, wherein, the atomizing control switch is a sensing switch.

10. The electronic cigarette as described in claim 9, wherein, the sensing switch is a capacitance-type sensing switch or an airflow sensing switch.

11. The electronic cigarette as described in claim 9, wherein, the atomizing control circuit is integrated within the sensing switch.

12. The electronic cigarette as described in claim 9, wherein, the atomizing control unit further comprises an atomizing control circuit board connected with the battery and the sensing switch respectively, and the atomizing control circuit is integrated on the atomizing control circuit board.

13. The electronic cigarette as described in claim 8, wherein, the atomizing control switch is a key switch, and the atomizing control unit further comprises an atomizing control circuit board connected with the battery and the key switch respectively, and the atomizing control circuit is integrated on the atomizing control circuit board.

14. An electronic cigarette device, comprising an electronic cigarette, and further comprising an electronic cigarette casing, for accommodating the electronic cigarette, the electronic cigarette comprising a main rod with a nozzle configured at its one end, wherein, the main rod is further configured with a projection assembly at its another end away from the nozzle, the projection assembly comprises a projection light source, a slide unit configured in front of the projection light source and a light source control unit connected with the projection light source to control operation of the projection light source; wherein a convex lens is coaxially configured between the projection light source and the slide unit; and the slide unit comprises a slide and a locking groove for insertion of the slide, and the locking groove is defined by two parallel and spaced glasses.

* * * * *